(No Model.)
E. WHITNEY.
MAGAZINE FIRE ARM.
No. 273,654. Patented Mar. 6, 1883.
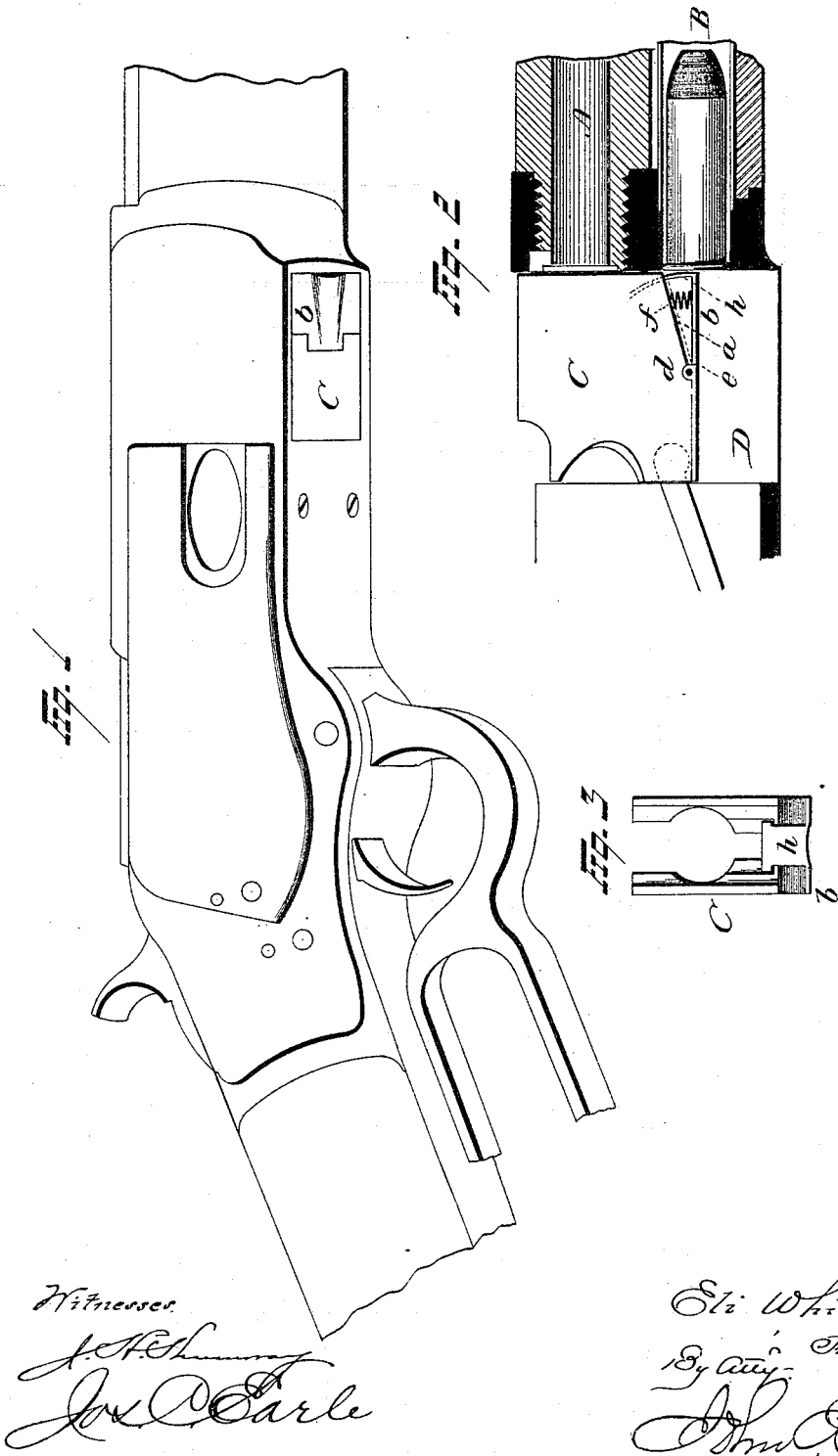

UNITED STATES PATENT OFFICE.

ELI WHITNEY, OF NEW HAVEN, CONNECTICUT.

MAGAZINE FIRE-ARM.

SPECIFICATION forming part of Letters Patent No. 273,654, dated March 6, 1883.

Application filed November 4, 1882. (No model.)

*To all whom it may concern:*

Be it known that I, ELI WHITNEY, of New Haven, in the county of New Haven and State of Connecticut, have invented a new Improvement in Magazine Fire-Arms; and I do hereby declare the following, when taken in connection with accompanying drawings and the letters of reference marked thereon, to be a full, clear, and exact description of the same, and which said drawings constitute part of this specification, and represent, in—

Figure 1, a perspective view from the under side; Fig. 2, a sectional side view; Fig. 3, a front end view of the carrier.

This invention relates to an improvement in that class of magazine fire-arms in which a vertically-moving carrier is employed to transfer the cartridges from the magazine to a position in front of the barrel, where they are forced from the carrier by a longitudinally-moving breech-piece, which passes through the carrier when in its upward position, and then the carrier returns to its downward position, with its opening in line with the magazine to receive a new cartridge, and such as commonly known as the "Smith & Wesson system," the object of my invention being to facilitate the charging of the magazine; and the invention consists in constructing the carrier so that when in its raised position its lower surface is in a plane below the upper line of the magazine, the front portion of the lower surface cut off, a trap hinged to the carrier so as to complete the surface, yet permit the forward portion to be turned upward and away so as to expose the entire mouth of the magazine for the insertion of cartridges, and when a cartridge has been fully inserted the trap will spring down in rear of the cartridge, so as to hold it in the magazine, the said trap constructed with a tongue at its forward end, extending up into the carrier, so as to close the forward end of the space between the trap and the carrier, as more fully hereinafter described.

A represents the barrel; B, the magazine; C, the carrier, which is moved in a vertical recess, D, in the frame from its down position, with its opening in front of the magazine, bringing the same opening into line with the barrel, substantially as in the Smith & Wesson gun, and too well known to require detailed description.

As seen in Fig. 2, the plane of the bottom of the carrier, when in its raised position, is in a line below the extreme upper surface of the magazine. At its forward end it is cut away so as to leave the front end of the carrier itself free from the magazine. In the cut-away space $a$ of the carrier a trap, $b$, is hinged to the carrier, as at $d$, at a point back from the front end, about midway of the length of the carrier, and which extends forward flush with the front end of the carrier, the hinge shouldered, as at $e$, so as to arrest the trap in its outward movement when it arrives at a position in the plane with the bottom of the carrier, as seen in Fig. 2. Between the carrier and the trap a suitable spring, $f$, is arranged, the tendency of which is to force the trap outward and hold it in the same plane with the bottom of the carrier, but yet permit the trap to be depressed. The front end of the trap partially covers the rear end of the magazine when the carrier is raised, as seen in Fig. 2, but when the trap is depressed, as seen in broken lines in that figure, then the mouth of the magazine is exposed.

The cartridges are inserted into the magazine by first throwing up the carrier, as in Fig. 2, then introducing the point of the cartridge toward the mouth of the magazine, and pressing it downward will cause the trap to give way before the pressure and permit the cartridge to enter the magazine, into which it is forced by the operator until its head is beyond the front end of the trap. Thus the trap will spring outward and serve as a latch to hold the cartridge in the magazine. Each successive cartridge is introduced in like manner, the latch or trap bearing against the head of the last inserted cartridge.

The forward end of the trap is constructed with a tongue, $h$, curved backward on a circle of which the hinging-point $d$ is the center, and works in a corresponding guide or recess in the forward end of the breech-piece as the trap is moved up or down, and which tongue serves to close the front end of the recess between the trap and breech-block and prevent any foreign substance from entering that recess to interfere with the operation of the trap. The tongue may be constructed with projections on each side, as seen in Fig. 3, which will serve as stops to arrest the trap when it is thrown to its extreme outward position, instead of relying upon the hinge, and thus serve the double purpose, or either of the purposes, of a stop and as a cover to close the recess.

I do not claim, broadly, hinging a latch to the bottom of the carrier, which will yield for the introduction of the cartridge to the magazine and serve as a latch to catch the cartridge when inserted.

I claim—

The combination of a barrel open at the rear, a magazine arranged beneath the barrel and also open at the rear, a carrier arranged to move vertically in rear of both the magazine and barrel and whereby the cartridges from the magazine will be respectively received into the carrier when in its down position, and when the carrier is moved to its up position will present the cartridge so received in line with the barrel, and when in the last-named position the plane of the lower surface of the carrier will be below the upper line of the magazine, the front end of the carrier recessed to a point above the said upper line of the magazine, with a trap hinged at the rear in said recess, and with a spring arranged to force the trap outward into the plane of the lower surface of the carrier and in front of the rear end of the magazine, but yet permit the forward end of the trap to be raised to a point which will uncover the rear end of the magazine for the insertion of cartridges, the said trap constructed with a tongue at its forward end extending up into the carrier, substantially as described.

ELI WHITNEY.

Witnesses:
J. H. SHUMWAY,
JOS. C. EARLE.